(12) United States Patent
Inagaki et al.

(10) Patent No.: US 6,266,180 B1
(45) Date of Patent: Jul. 24, 2001

(54) OPTICAL FIBER AMPLIFIER USING OPTICAL FIBER HAVING A PORTION WHICH SUPPRESSES NONLINEAR OPTICAL PHENOMENA

(75) Inventors: Shinya Inagaki; Keiko Takeda; Kaoru Moriya; Hiroshi Onaka, all of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/339,188

(22) Filed: Jun. 24, 1999

(30) Foreign Application Priority Data

Jul. 9, 1998 (JP) ................................................. 10-194428

(51) Int. Cl.[7] ....................................................... H01S 3/10
(52) U.S. Cl. ................................ 359/337; 359/341; 372/6
(58) Field of Search ..................................... 359/341, 337, 359/290, 321, 161; 385/122, 123, 143

(56) References Cited

U.S. PATENT DOCUMENTS

| 5,267,339 | * | 11/1993 | Yamauchi | ............................. 385/123 |
| 5,731,892 | * | 3/1998 | DiGiovanni et al. | ................. 359/341 |
| 5,742,427 | * | 4/1998 | Kakui | ..................... 359/341 |
| 5,917,648 | * | 6/1999 | Harker | ................................. 359/341 |
| 5,978,122 | * | 11/1999 | Kawazawa et al. | .................. 359/179 |

FOREIGN PATENT DOCUMENTS

| 5-227127 | 9/1993 | (JP) . |
| 5-292039 | 11/1993 | (JP) . |

\* cited by examiner

Primary Examiner—Thomas H. Tarcza
Assistant Examiner—Deandra Hughes
(74) Attorney, Agent, or Firm—Staas & Halsey, LLP

(57) ABSTRACT

An optical amplifier which suppresses the occurrence of a nonlinear optical phenomena, such as four-wave mixing. The optical amplifier includes an optical fiber doped with a rare earth element, and a light source providing excitation light to the fiber so that a wavelength division multiplexed (WDM) light is amplified as the WDM light travels through the fiber from a first point to a second point along the fiber. A third point exists along the fiber between the first and second points at which a power of the WDM light substantially reaches a level producing a nonlinear optical phenomenal. A first portion of the fiber is between the first point and the third point, and a second portion of the fiber is between the third point and the second point. The second portion suppresses the occurrence of the nonlinear optical phenomena as compared to the first portion. The second portion can have various different constructions to provide the required suppression effect.

70 Claims, 4 Drawing Sheets

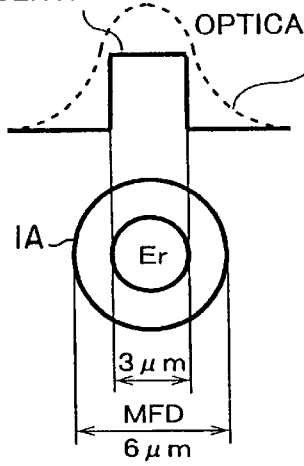
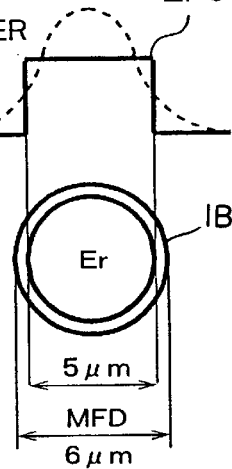
FIG. 4(A) FIG. 4(B)
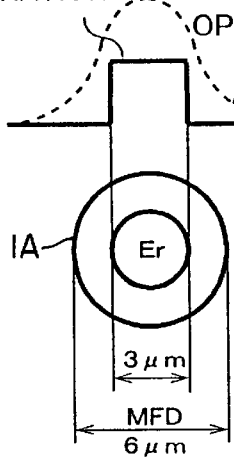
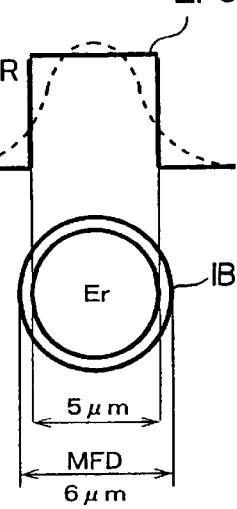
FIG. 5(A) FIG. 5(B)

OPTICAL FIBER AMPLIFIER USING OPTICAL FIBER HAVING A PORTION WHICH SUPPRESSES NONLINEAR OPTICAL PHENOMENA

CROSS-REFERENCE TO RELATED APPLICATIONS

This application is based on, and claims priority to, Japanese application number 10-194428, filed on Jul. 9, 1998, in Japan, and which is incorporated herein by reference.

BACKGROUND OF THE INVENTION

1. Field of the Invention

The present invention relates to an optical fiber amplifier which uses an optical fiber having a portion which suppresses nonlinear optical phenomena, such as four wave mixing.

2. Description of the Related Art

Optical fiber amplifiers are typically used in optical communication systems to directly amplify light signals without converting the light signals into electrical signals.

A conventional optical fiber amplifier uses an optical fiber having a core portion doped with a rare earth element, such as erbium (Er). Such an erbium doped fiber is hereafter referred to as an EDF. Excitation light is supplied to the EDF so that a light signal travelling through the EDF is amplified by an induced emission phenomena of the erbium inside the excited EDF.

Furthermore, wavelength division multiplexing (WDM) is being used to increase the transmission capacity of optical communication systems. With WDM, a plurality of different wavelength signal lights are multiplexed together into a WDM signal light. The WDM signal light is then transmitted through a single optical fiber as a transmission path.

If an optical fiber amplifier is used as a repeater for such a WDM optical communication system, it is possible to amplify the WDM signal light so that all the different wavelength signal lights in the WDM signal light are collectively amplified. The amplified WDM signal light can then be demultiplexed into the plurality of different wavelength signal lights.

Therefore, high capacity, long distance light transmission can be realized with a WDM optical communication system employing optical fiber amplifiers.

However, when conventional optical fiber amplifiers are used in a WDM optical communication system, the input optical power to the optical fiber amplifier is relatively large. As a result, there is a problem of waveform degradation due to nonlinear optical phenomena such as, for example, four-wave mixing (FWM). In general, FWM is produced if the optical power input to the optical fiber exceeds a set value. The production of FWM increases in proportion to the length of the optical fiber which transmits the large power optical signal, and becomes greater the smaller the effective optical transmission cross-sectional area of the optical fiber. Consequently, by setting an upper limit value of the input optical power in accordance with the optical fiber amplifier being used, the occurrence of four-wave mixing can be prevented.

For example, in the case where a dispersion-shifted fiber (DSF) with several tens of kilometers in length and an effective optical transmission cross-sectional area of 50 $\mu m^2$ is used in a WDM optical communication system, then in order to prevent the occurrence of FWM, it is necessary to set the optical power input to the DSF to equal to or less than −5 dBm.

Now, consider an optical fiber amplifier using an EDF. In general, the length of the EDF is around several tens of meters and the effective optical transmission cross-sectional area is around 13 $\mu m^2$. Therefore, compared to the above mentioned case of the DSF, the length of the EDF is approximately 1/1000 times that of the DSF, and the effective optical transmission cross-sectional area of the EDF is approximately 1/4 times that of the DSF. Consequently, the proportion of occurrence of FWM in the EDF compared to the case of the DSF, is approximately 1/1000 times in relation to length, and approximately four times in relation to the effective optical transmission cross-sectional area.

It is known that the upper limit value P for the input optical power to prevent the occurrence of FWM is relationship given by the following Equation (1) for a length L of the optical fiber being used, and for an effective optical transmission cross-sectional area Aeff.

Equation (1):

$$P \, (Aeff/L)^{1/2}$$

If an upper limit value for the input optical power for the case of an EDF is estimated using the above relationship of Equation (1), then this is approximately 12 dB higher than the upper limit value for the case of the DSF. Hence, the upper limit value for the EDF can be considered to be around +7 dBm.

However, in the case where an optical fiber amplifier using an EDF is used as a repeater for a WDM optical communication system, there is a possibility that the power of the WDM signal light amplified inside the EDF exceeds the above mentioned upper limit value.

For example, FIG. 1 is a diagram showing the optical power inside an EDF of an optical fiber amplifier, from an input end to an output end of the EDF. As shown in FIG. 1, inside the EDF, the WDM signal light input to one end of the EDF increases in optical power with propagation in the longitudinal direction of the fiber. Therefore, even if the optical power at the input end is equal to or less than the upper limit value, there can be the situation where the optical power exceeds the upper limit value before reaching the output end. Consequently, during the interval from where the optical power exceeds the upper limit value until the signal light output end, the WDM signal light is propagated while being amplified. Hence, there is the likelihood that FWM will occur, thereby degrading the waveform of the WDM signal light.

As can be determined from Equation (1), the occurrence of FWM in the EDF can be suppressed by shortening the length of the EDF. However, in order to shorten the length of the EDF while maintaining the same gain, the absorption and the radiation per unit length of the EDF with respect to the signal light must be increased. For example, as a technique for realizing this, use of an EDF with a high erbium concentration, or use of an EDF with a large erbium doped diameter has been considered.

However, if the erbium concentration is increased, energy conversion between the erbium ions occurs, resulting in a density extinction which lowers the excitation efficiency of the EDF. With current EDFs, the standard for the erbium concentration is around 500 ppm. Furthermore, if the erbium doped diameter is increased, then the erbium is doped in a portion where the energy density of the excitation light is low and the excitation effect is minimal. Hence, as with the case where the erbium concentration is increased, there is the likelihood of a drop in the excitation efficiency of the EDF.

Therefore, the shortening of the length of the EDF in order to suppress the occurrence of FWM, and modification so that the amplification characteristics of the EDF are not degraded, are contrary to each other, and it is difficult to realize both simultaneously.

SUMMARY OF THE INVENTION

Accordingly, it is an object of the present invention to provide an optical fiber amplifier which amplifies a WDM signal light, wherein waveform degradation due to the occurrence of nonlinear optical phenomena is reduced while suppressing a reduction in excitation efficiency.

Additional objects and advantages of the invention will be set forth in part in the description which follows, and, in part, will be obvious from the description, or may be learned by practice of the invention.

Objects of the present invention are achieved by providing an optical amplifying fiber doped with a rare earth element to enable collective amplification of a WDM signal light which includes a plurality of signal lights of different wavelengths multiplexed together. The fiber has a first region located on a signal light input side of the fiber, and a second region located on a signal light output side of the fiber. A border between the first and second regions is along the longitudinal direction of the fiber where a power of the WDM signal light reaches a level which can produce a nonlinear optical phenomena. The second region has a construction which is able to suppress the occurrence of nonlinear optical phenomena. The first and second regions can be constructed by connecting two rare earth element doped optical fibers of different construction.

Objects of the present invention are also achieved by providing an optical fiber amplifier which uses the above-described fiber as an amplification medium. With such an optical amplifier, at least one light source provides excitation light to the fiber so that a WDM signal light is amplified as the WDM signal light travels through the first and second regions of the fiber. More specifically, the WDM signal light first passes through the first region of the fiber to reach the border position, is amplified up to an optical power level at which a nonlinear optical phenomena, such as, for example, FWM, can be produced. After this, the amplified WDM signal light is amplified to a required optical power by passing through the second region of the fiber. When the WDM signal light passes though the second region, since the optical power is large, the occurrence of the nonlinear optical phenomena is possible. However, by having the second region incorporate a construction which is able to suppress this occurrence, it is difficult for the nonlinear optical phenomena to occur. As a result, waveform degradation of the signal light due to the nonlinear optical phenomena is reduced.

In order for the second region of the fiber to have a construction which is able to suppress the occurrence of the nonlinear optical phenomena, an absorption and radiation per unit length with respect to the wavelength division multiplexed signal light may be made greater in the second region than that for the first region. More specifically, with the second region, a doping concentration of the rare earth element may be made higher than that for the first region, or the doped diameter of the rare earth element may be made greater than that for the first region. By having such a construction, since the fiber length for the second region can be shortened while suppressing a drop in the excitation efficiency, it is difficult for the nonlinear optical phenomena to occur.

As another construction for the second region, a mode field diameter may be made greater than that for the first region. By making the mode field diameter greater, the optical power density inside the second region is reduced, thus giving a construction where it is difficult for the nonlinear optical phenomena to occur.

As another construction for the second region, a relative index difference may be made smaller than that for the first region. If the relative index difference is made smaller, the effective optical transmission cross-sectional area becomes large, so that the occurrence of the nonlinear optical phenomena is suppressed.

Moreover, as another construction for the second region, the wavelength dispersion may be made larger than that for the first region. Since it is difficult for the nonlinear optical phenomena to occur in a fiber with a large wavelength dispersion, degradation of the waveform of the signal light is reduced.

Furthermore, objects of the present invention are also achieved by providing a two stage optical fiber amplifier which includes first and second series connected optical fiber amplifier sections. Light is amplified by the first optical fiber amplifier section and then by the second optical fiber amplifier section. In this case, the power of a signal light output from the second optical fiber amplifier section reaches a level which can produce a nonlinear optical phenomena. However, the second optical fiber amplifier section includes a fiber having one of the above mentioned constructions, so that the nonlinear optical phenomena is suppressed in the second optical fiber amplifier section.

BRIEF DESCRIPTION OF THE DRAWINGS

These and other objects and advantages of the invention will become apparent and more readily appreciated from the following description of the preferred embodiments, taken in conjunction with the accompanying drawings of which:

FIGS. 4(A) and 4(B) are diagrams showing fiber cross-sections and erbium doping states in respective regions of an EDF, according to an embodiment of the present invention.

FIGS. 5(A) and 5(B) are diagrams showing fiber cross-sections and erbium doping states in respective regions of an EDF, according to an embodiment of the present invention.

DESCRIPTION OF THE PREFERRED EMBODIMENTS

Figure 8:
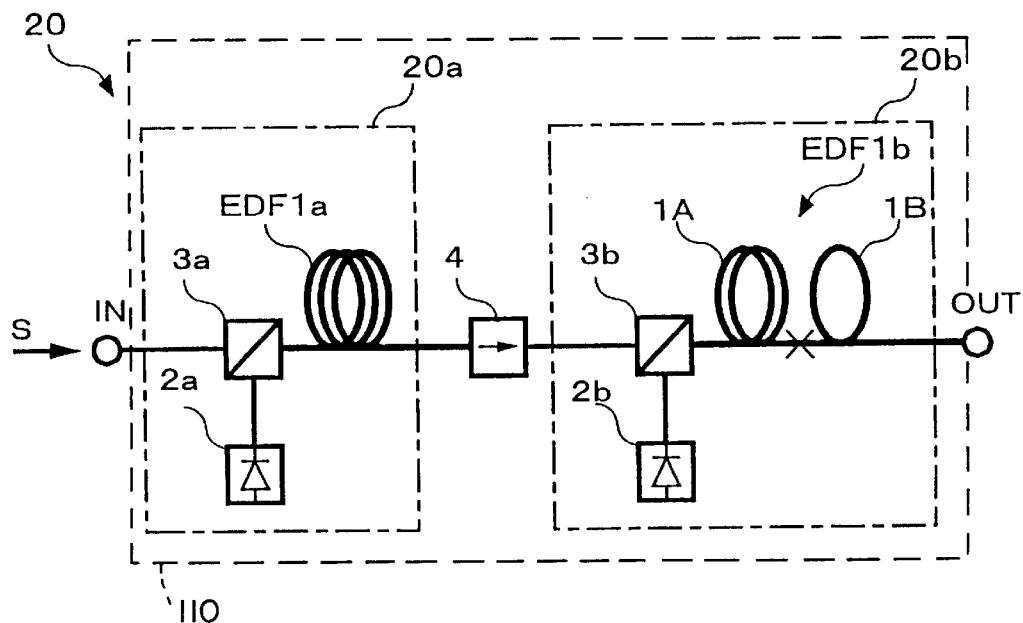
FIG. 8 is a diagram showing a two stage optical fiber amplifier, according to an embodiment of the present invention.
Figure 1:
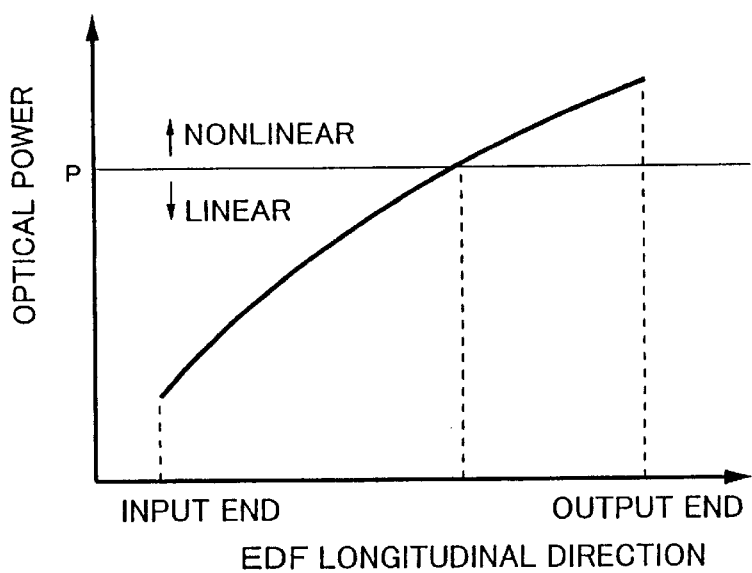
FIG. 1 is a diagram showing the change in signal light power in an EDF of a conventional optical fiber amplifier.

Reference will now be made in detail to the present preferred embodiments of the present invention, examples of which are illustrated in the accompanying drawings, wherein like reference numerals refer to like elements throughout.

Figure 2:
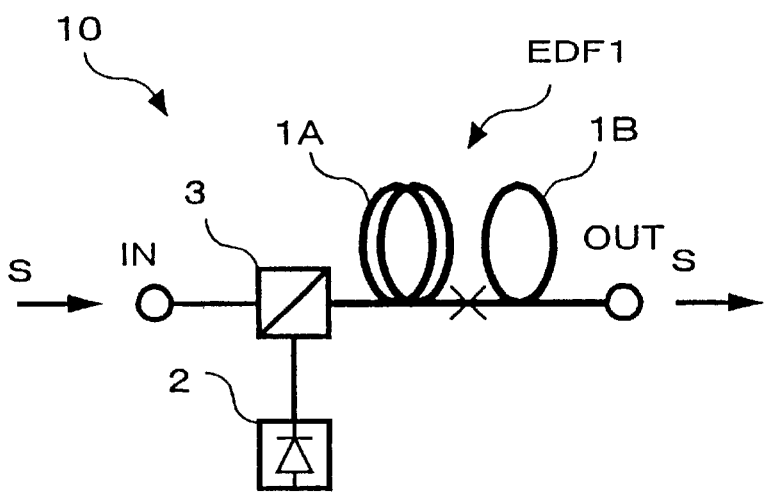
FIG. 2 is a diagram showing an optical fiber amplifier, according to an embodiment of the present invention.

FIG. 2 is a diagram showing an optical fiber amplifier, according to an embodiment of the present invention. Referring now to FIG. 2, an optical fiber amplifier 10 comprises, for example, an erbium doped fiber (EDF) 1 serving as an optical amplifying fiber, an excitation light source 2 generating excitation light, and a multiplexer 3 serving as a multiplexing section supplying the excitation light output from excitation light source 2 to EDF 1.

EDF 1 has first and second regions 1A and 1B with different erbium concentrations. Region 1A is located on the signal light input side with respect to the longitudinal direction of EDF 1 (left side in FIG. 2), and region 1B is located on the signal light output side (right side in FIG. 2). Region 1A uses, for example, an EDF wire with an erbium concentration of 500 ppm, a mode field diameter (MFD) of 6 $\mu$m, and an erbium doped diameter of 3 $\mu$m. The wire of region 1A is the same as that generally used in conventional optical fiber amplifiers. On the other hand, region 1B uses, for example, an EDF wire with an erbium concentration of 1000 ppm, a mode field diameter of 6 $\mu$m, and an erbium doped diameter of 3 $\mu$m. These various values are only provided as an example, and the present invention is not limited to these specific values.

The EDF wires of regions 1A and 1B are connected together by, for example, a splice or by an optical connector, to thereby form a single EDF 1. However, there are many ways to connect regions 1A and 1B, and the present invention is not limited to any specific type of connection.

The length of the respective regions 1A and 1B is set in accordance with an upper limit value P of the input optical power for preventing the occurrence of four-wave mixing (FWM). A specific setting is described later.

Excitation light source 2 is a known light source, which generates excitation light of, for example, a wavelength of 0.98 $\mu$m or 1.48 $\mu$m, which can excite the erbium inside EDF 1. There are many different types of excitation light sources, and the present invention is not limited to any specific type of light source. Moreover, the present invention is not limited to any specific excitation light wavelength.

Multiplexer 3 multiplexes the excitation light from excitation light source 2 with a WDM signal light S from outside, and sends the multiplexed light to EDF 1. FIG. 2 shows the case of a forward excitation type amplifier, where the excitation light and the WDM signal light S are propagated inside EDF 1 in the same direction. However, the present invention is not limited to forward excitation, and is applicable to backward excitation type amplifiers and bi-directional excitation type amplifiers.

With optical fiber amplifier 10 in FIG. 2, the excitation light generated by excitation light source 2 is supplied to EDF 1 via multiplexer 3, so that the respective regions 1A and 1B of EDF 1 attain an excitation state. Then, when the WDM signal light S from outside is input to an input port IN of optical fiber amplifier 10, the signal light S is sent to one end of EDF 1 via multiplexer 3.

As an example, the WDM signal light S can include thirty-two waves (or channels) in a wavelength band of, for example, 1535 nm to 1565 nm, multiplexed together. Furthermore, for the amplifying conditions in EDF 1, the case is considered where, for example, the maximum power of the input WDM signal light is assumed to be −5 dBm, and the output signal light power after amplification is set to 12 dBm. However, the present invention is not limited to any specific number of multiplexed signal lights, any specific wavelengths, any specific wavelength bands, or any specific power levels.

Figure 3:
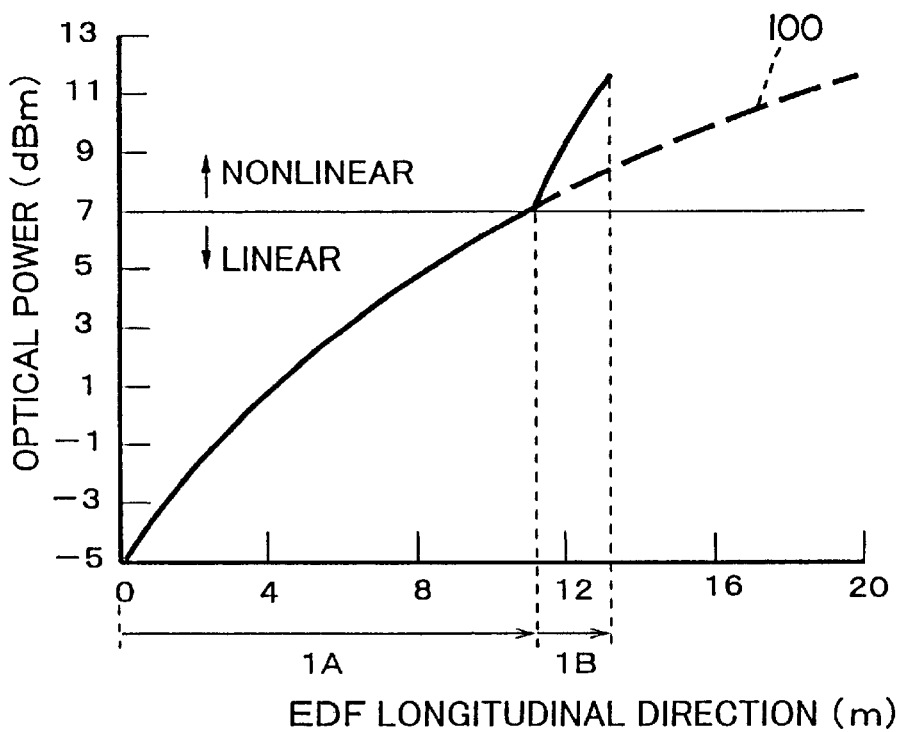
FIG. 3 is a diagram showing the change in signal light power in an EDF of the optical fiber amplifier in FIG. 2, according to an embodiment of the present invention.

FIG. 3 is a diagram showing the change in signal light power in EDF 1 in the longitudinal direction, according to an embodiment of the present invention. As shown in FIG. 3, the WDM signal light S of −5 dBm input to one end of EDF 1 is amplified by the induced emission effect of the excited erbium, with propagation along region 1A. After this, at the point in time when the signal light arrives at a location in the vicinity of approximately 11 m from the input end, the signal light power in EDF 1 reaches 7 dBm. If as mentioned above, the optical power exceeds 7 dBm (the upper limit value to prevent the occurrence of FWM in the EDF), then FWM occurs in EDF 1, and the proportion of this occurrence becomes larger the longer the length of the EDF propagating the signal light amplified above 7 dBm.

The curve 100, shown by the broken line in FIG. 3, indicates the change up until the output signal light power becomes 12 dBm, assuming the case where an EDF wire the same as for region 1 A is also connected to the portion beyond 11 m from the input end (the same as for the EDF used in the conventional optical fiber amplifier). If in this way, a required output optical power is to be obtained with the overall EDF 1 as the same wire, since the distance for propagating a signal light of a high power exceeding the upper limit value in the EDF 1 is increased, there is the likelihood of the occurrence of waveform degradation due to FWM.

Therefore, by making the portion approximately 11 m from the signal light input end where the signal light power in EDF 1 reaches 7 dBm a boundary, after which EDF 1 wire is changed to one with a high erbium concentration, the distance for propagating a signal light of a high power exceeding the upper limit value in EDF 1 is shortened. That is, the portion up to approximately 11 m from the input end of EDF 1 is made region 1A, and the portion beyond the 11 m is made region 1B.

With the EDF wire of region 1B, since the erbium concentration is higher than that for the EDF wire of region 1A, then the absorption and radiation per unit length with respect to the WDM signal light S is increased. As a result, the length of the EDF required for amplifying the signal light power exceeding 7 dBm to a required output level, is shortened to approximately ¼ times of that for the case where the same EDF wire is used. Consequently, the proportion of the occurrence of FWM is reduced, and waveform degradation of the WDM signal light is reduced.

In this way, with the optical amplifier in FIG. 2, the point where the power of the WDM signal light S input to EDF 1 is assumed to exceed the upper limit value for preventing the occurrence of FWM is made the border, and the EDF wire for the signal light output end side after this border is made one with a large absorption and radiation per unit length. Hence, the occurrence of FWM can be suppressed while maintaining amplification characteristics close to those for when EDF 1 is constructed from the same EDF wire. Consequently, it is possible to provide an optical fiber amplifier for a WDM optical communication system wherein suppression of the waveform degradation due to FWM is achieved.

FIGS. 4(A) and 4(B) are diagrams showing fiber cross-sections and the erbium doping states for regions 1A and 1B, respectively, of EDF 1, according to an additional embodiment of the present invention. Referring now to FIGS. 4(A) and 4(B), the erbium doped diameter of the EDF wire of region 1B is made greater than that for the EDF wire of region 1A.

More specifically, the mode field diameter for regions 1A and 1B is 6 $\mu$m, the erbium doped diameter for region 1A is 3 μm, and the erbium doped diameter for region 1B is 5 μm. Furthermore, the doping concentration of the erbium is 500 ppm for both regions 1A and 1B.

With an optical fiber amplifier using an EDF having regions 1A and 1B shown in FIGS. 4(A) and 4(B), by increasing the erbium doped diameter of the wire for region 1B, then for the signal light propagated therealong, the proportion of the light subjected to absorption and radiation by the erbium is increased, and hence the absorption and radiation per unit length is increased.

Consequently, as shown in FIG. 3, by using the optical fiber of region 1B shown in FIG. 4(B) as the optical amplifying fiber for amplifying the signal light which had reached the level for producing FWM, the occurrence of FWM can be suppressed.

FIGS. 5(A) and 5(B) are diagrams showing fiber cross-sections and erbium doping states in regions 1A and 1B, respectively, of EDF 1, according to an embodiment of the present invention. Referring now to FIGS. 5(A) and 5(B), the mode field diameter for regions 1A and 1B is 6 μm, the erbium doped diameter for region 1A is 3 μm, the erbium doped diameter for region 1B is 5 μm, the erbium doping concentration for region 1A is 500 ppm, and the erbium doping concentration for region 1B is 1000 ppm.

By using such an EDF 1, the erbium doping concentration for region 1B is higher than that for region 1A, and the erbium doped diameter is greater. Hence, the length of region 1B can be much shorter. Consequently, the occurrence of FWM can be more effectively suppressed.

Figures 6A, 6B:
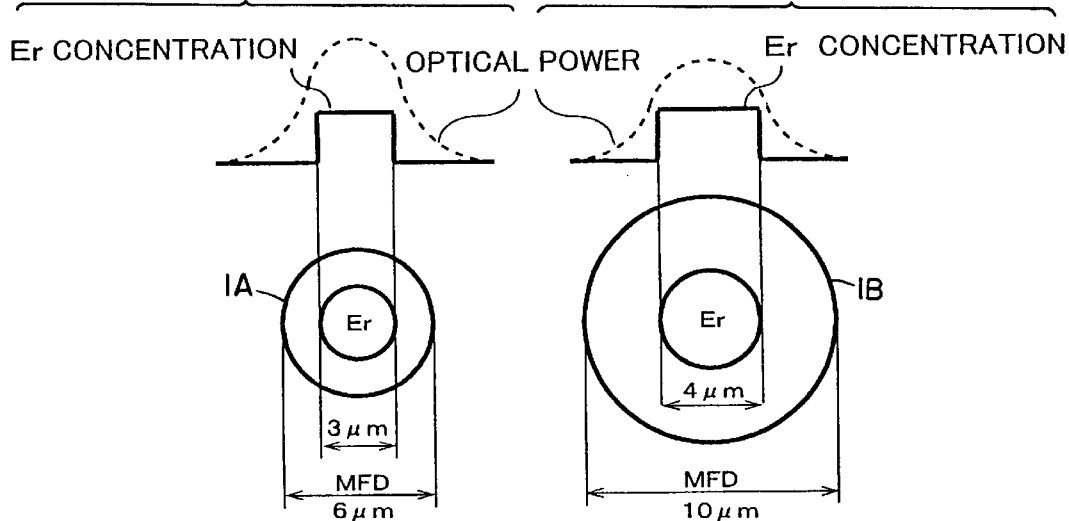
FIGS. 6(A) and 6(B) are diagrams showing fiber cross-sections and erbium doping states in respective regions of an EDF, according to an additional embodiment of the present invention.

FIGS. 6(A) and 6(B) are diagrams showing fiber cross-sections and erbium doping states in regions 1A and 1B of EDF 1, respectively, according to an additional embodiment of the present invention. With regions 1A and 1B in FIGS. 6(A) and 6(B), the occurrence of FWM is suppressed by making the mode field diameter of the EDF wire of region 1B of EDF 1 larger than the mode field diameter of the EDF wire of region 1A. An optical amplifier using regions 1A and 1B in FIGS. 6(A) and 6(B) is the same as that in FIG. 2, except that region 1B is different.

For the EDF wire of region 1B in FIG. 6(B), for example, an erbium concentration is 500 ppm, a mode field diameter is 10 μm, and an erbium doped diameter is 4 μm. Here, the EDF wire of region 1A is the same as that previously described for the optical amplifier in FIG. 2.

With region 1B where the optical power in EDF 1 is equal to or above 7 dBm, by increasing the mode field diameter of EDF 1 from 6 μm to 10 μm, the optical power density in region 1B becomes approximately ⅓ of the optical power density in region 1A. Hence, it is difficult for FWM to occur in region 1B. Furthermore, since the erbium doped diameter in region 1B is increased from 3 μm to 4 μm, it is possible to amplify the signal light power to a required level without necessarily increasing the EDF wire length in region 1B.

In this way, with regions 1A and 1B of FIGS. 6(A) and 6(B), respectively, by making the mode field diameter of region 1B greater than that for region 1A, the occurrence of FWM can be suppressed, and the signal light waveform degradation thus reduced.

Here, the respective erbium doped diameters of the regions 1A and 1B are made different. However, even if the respective erbium doped diameters of regions 1A and 1B are left same and only the mode field diameter of region 1B is made larger than that for region 1A, the effect of suppressing the occurrence of FWM is obtained. Moreover, the effect can be improved by combining the embodiments of the present invention described in FIGS. 2, 4(A), 4(B), 5(A), 5(B), 6(A) and 6(B).

Moreover, according to an additional embodiment of the present invention, the occurrence of FWM can be suppressed by making the relative index difference of the core and the cladding of the EDF wire of region 1B of EDF 1 smaller than the relative index difference of the EDF wire of region 1A. To achieve this, the relative index difference is changed, for example, by making the core and cladding diameters the same construction for both regions 1A and 1B, and changing an amount of germanium (Ge) serving as a dopant. Furthermore, instead of changing the amount of germanium between regions 1A and 1B, the relative index difference can be changed by additionally doping with fluorine (F) in the fiber of region 1B. Here, the embodiments of the present invention in FIGS. 2, 4(A), 4(B), 5(A) and 5(B) can be combined with the present embodiment.

For example, For the EDF wire of region 1B, a wire with a small relative index difference of around 0.3% is used. Here, for the EDF wire of region 1A, a general EDF wire wherein the relative index difference is equal to or above 1% is used.

In region 1B where the optical power in EDF 1 becomes equal to or above 7 dBm, by having the relative index difference of EDF 1 at a small value of around 0.3%, then it is difficult for FWM to occur in region 1B. That is, if the relative index difference of EDF 1 is made small, the nonlinear refractive index drops, and the effective optical transmission cross-sectional area Aeff increases. Therefore, as will be understood from the relation of the above mentioned Equation (1), the upper limit value P for the optical power is increased. Consequently, the occurrence of FWM in region 1B is suppressed, and waveform degradation of the signal light can be reduced.

Figures 7A, 7B:
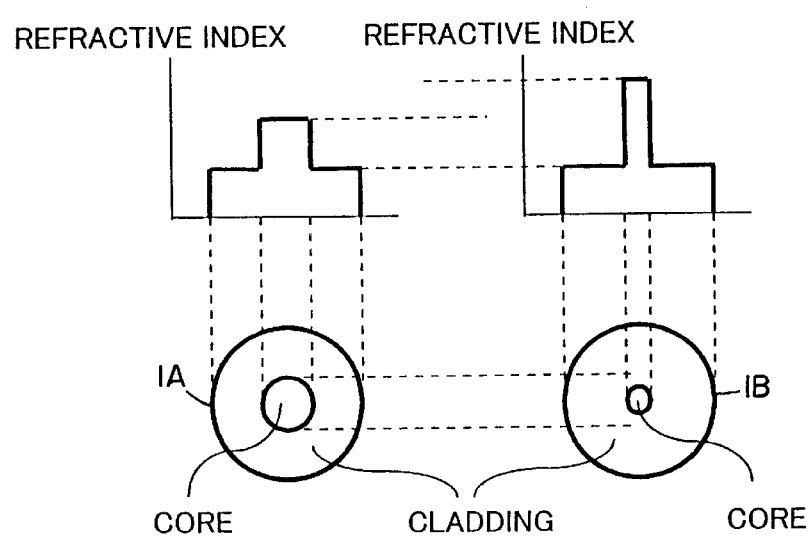
FIGS. 7(A) and 7(B) are diagrams showing changes in refractive index in respective regions of an EDF, according to an embodiment of the present invention.

FIGS. 7(A) and 7(B) are diagrams showing changes in refractive index in regions 1A and 1B, respectively, of EDF 1, according to a further embodiment of the present invention. With regions 1A and 1B of FIGS. 7(A) and 7(B), the occurrence of FWM is suppressed by using a high wavelength dispersion EDF for the EDF wire of region 1B of EDF 1. The construction of an optical amplifier according to the present embodiment of the present invention, apart from the high wavelength dispersion EDF being applied to region 1B, is the same as the construction of that in FIG. 2.

The high wavelength dispersion EDF used for the EDF wire of region 1B has, as shown in FIG. 7(B), the diameter of the portion where the refractive index of the core portion is increased made smaller than that for the normal EDF wire used in region 1A. More specifically, a high wavelength dispersion EDF with the diameter of the high refractive index portion around 2 μm is used for the EDF wire of region 1B.

It is known that it is more difficult for FWM to occur in an optical fiber as the wavelength dispersion is larger. Therefore, by applying a high wavelength dispersion EDF to region 1B which propagates the high power signal light, the occurrence of FWM is suppressed, and waveform degradation of the signal light can be reduced. Here, an important point is that since with a reduction in the core diameter the mode field diameter also reduces, then the dispersion value for the high wavelength dispersion EDF must be set so that the suppression effect on the FWM due to the wavelength dispersion is greater than the increase in the FWM due to the reduction in mode field diameter.

With the above embodiments of the present invention, the description has been for a single stage optical fiber amplifier. However, the present invention is not limited to a single stage optical fiber amplifier, and can also be applied to a multistage optical fiber amplifier with two or more optical fiber amplifiers connected in series.

For example, FIG. 8 is a diagram showing a two stage optical fiber amplifier, according to an embodiment of the present invention. Referring now to FIG. 8, an optical fiber amplifier 20 includes optical fiber amplifier sections 20a and 20b connected in series with an optical isolator 4 therebetween. The pre-stage optical fiber amplifier section 20a located at the signal light input side is of the same construction as, for example, a conventional optical fiber amplifier. More specifically, optical fiber amplifier section 20a comprises an EDF 1a which uses a single EDF wire, an excitation light source 2a, and a multiplexer 3a. On the other hand, the post-stage optical fiber amplifier section 20b is, for example, of the same construction as the optical fiber amplifier of in FIG. 2. For example, optical fiber amplifier section 20b comprises an EDF 1b having two regions 1A and 1B which use different EDF wires, an excitation light source 2b and a multiplexer 3b. Of course, optical fiber amplifier section 20b can have a configuration as in any of the embodiments of the present invention described above.

While not shown in FIG. 8, an optical isolator may be inserted in the signal light input end of optical fiber amplifier section 20a, or the signal light output end of optical fiber amplifier section 20b.

Furthermore, in FIG. 8, EDF 1b of the post-stage optical fiber amplifier section 20b has two regions 1A and 1B. However, the construction is not limited to this, and EDF 1b may be constructed with only the region 1B.

In general, with the two stage optical fiber amplifier, an improvement in the noise characteristics can be achieved by once amplifying the input signal light in pre-stage optical amplifier section 20a. The signal light is then amplified to a required power in post-stage optical fiber amplifier section 20b to achieve a high output. Consequently, the power of the signal light propagated along post-stage optical fiber amplifier section 20b can exceed the upper limit value for preventing the occurrence of FWM. As a specific example, with an optical fiber amplifier where the signal light power is amplified by pre-stage optical fiber amplifier section 20a from −10 dBm to 3 dBm, and then the signal light is amplified from 3 dBm to 11 dBm in post-stage optical fiber amplifier section 20b, it can be assumed that part way along optical fiber amplifier section 20b, the optical level will reach to close to the 7 dBm for generating a nonlinear optical effect. In such a case, by using optical fiber amplifier 20 of the above construction, it is possible to suppress the occurrence of FWM.

Further, according to various aspects of the present invention, all the components of the optical amplifier can be enclosed in the same housing. For example, in FIG. 8, optical fiber amplifier sections 20a and 20b, and optical isolator 4, can be enclosed in the same housing 110. By enclosing the components in a single housing, the overall apparatus can be packaged and sold as a discrete component optical amplifier. Moreover, if the housing is made of an appropriate material, the optical amplifier could be used in optical submarine systems.

In addition, the pre-stage optical fiber amplifier section 20a of the optical amplifier preferably outputs a signal with sufficient power so as to be received by the post-stage optical fiber amplifier section 20b without requiring further amplification between the stages.

With the above embodiments of the present invention, the description has been for the case of a basic construction of a forward excitation type optical fiber amplifier. However, the present invention may be applied to a backward excitation type construction where the excitation light and the WDM signal light are propagated in opposite directions in the EDF, or a bi-directional excitation type construction where the excitation light is supplied from both ends of the EDF.

Furthermore, an EDF has been used for the optical amplifying fiber. However, a rare earth element doped fiber which is doped with a rare earth element other than erbium may be used.

According to above embodiments of the present invention, an optical fiber amplifier includes an EDF having two regions of different construction, an excitation light source for generating excitation light, and a multiplexer for supplying excitation light to the EDF. A border position of the respective regions of the EDF is set between a point where the power of the signal light reaches a level which can produce a nonlinear optical phenomena, and a signal light output side. The region located on the signal light output side of the border position can suppress the nonlinear optical phenomena as compared to the region located on the signal light input side of the border position. For example, the region located on the signal light output side has a higher concentration of erbium than that for the region located on the signal light input side. As a result, it is difficult for FWM to occur in the region of the output side which propagates high power signal light, and hence waveform degradation of the signal light is reduced. Other embodiments of the present invention provide different constructions for the different regions of the EDF.

According to the above embodiments of the present invention, an optical fiber is doped with a rare earth element to enable amplification of a WDM light as the WDM light travels through the fiber from a first point to a second point along the fiber. For example, the first and second points might represent the ends of the fiber, although these points can be somewhere along the fiber without being at the ends. A third point exists along the fiber between the first and second points at which a power of the WDM light substantially reaches a level producing a nonlinear optical phenomena. FIG. 3 illustrates an example of this "third" point being along the fiber where the WDM light substantially reaches a level producing a nonlinear optical phenomena. A first portion (such as, for example, region 1A in FIGS. 2 and 3) of the fiber is between the first point and the third point, and a second portion (for example, region 1B in FIGS. 2 and 3) of the fiber is between the third point and the second point. The second portion suppresses the occurrence of the nonlinear optical phenomena as compared to the first portion.

In the above definition of first, second and third points along the fiber, the first portion is described as being "between" the first point and the third point, and the second portion is described as being "between" the third point and the second point. Therefore, depending on how the various points are defined, the first portion does not necessarily have to, but could, extend the entire length from the first point to the third point, and the second portion does not necessarily have to, but could, extend the entire length from the third point and the second point.

As described above, a point exists along the fiber at which a power of the WDM light substantially reaches a level producing a nonlinear optical phenomena. Generally, this point defines a border between the two portions, or regions, of the fiber. Of course, there is a range at which this point can be located with respect to the production of the nonlinear optical phenomena, and still provide sufficient operation.

Preferably, this point is located along the fiber where the power of the WDM light reaches a level producing a nonlinear optical phenomenal ±3 dB. Therefore, ±3 dB represents a preferable range for this border point between fiber regions.

Generally, the threshold power level at which the WDM light reaches a level producing a nonlinear optical phenomena depends on the number of channels in the WDM light, and the channel spacing. As an example, with an erbium doped fiber (EDF), FWM occurs when an optical power per channel exceeds 3 to 7 dBm in the case of 0.8 nm channel spacing. The threshold power level will decrease linearly with decreasing channel spacing. For example, from experiments, with a single mode fiber (SMF), the inventors have determined that the threshold power of FWM is 4.6 dBm and 1.6 dBm in the case of 1.6 nm and 0.8 nm channel spacing, respectively.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An optical fiber doped with a rare earth element to enable amplification of a wavelength division multiplexed (WDM) light as the WDM light travels through the fiber from a first point to a second point along the fiber, wherein
   a third point exists along the fiber between the first and second points at which a power of the WDM light substantially reaches a level producing a nonlinear optical phenomena,
   a first portion of the fiber being between the first point and the third point, and a second portion of the fiber being between the third point and the second point, and
   the second portion of the fiber has a structure that suppresses the occurrence of the nonlinear optical phenomena as compared to the first portion.

2. An optical fiber as in claim 1, wherein the nonlinear optical phenomena is four wave mixing.

3. An optical fiber as in claim 1, wherein the first portion extends from the first point to the third point.

4. An optical fiber as in claim 1, wherein the second portion extends from third point to the second point.

5. An optical fiber as in claim 1, wherein
   the first portion extends from the first point to the third point, and
   the second portion extends from the third point to the second point.

6. An optical fiber as in claim 1, wherein the first portion extends from the first point to a fourth point along the fiber at which the power of the WDM light is within 3 dB of the power level at the third point.

7. An optical fiber as in claim 1, wherein the second portion extends from a fourth point along the fiber to the second point, the fourth point being a point along the fiber at which the power of the WDM light is within 3 dB of the power level at the third point.

8. An optical fiber as in claim 1, wherein
   the first portion extends from the first point to a point along the fiber at which the power of the WDM light is within 3 dB of the power level at the third point, and
   the second portion extends from a point at which the power of the WDM light is within 3 dB of the power level at the third point, to the second point.

9. An optical fiber as in claim 1, wherein an absorption and radiation per unit length with respect to the WDM light is greater in the second portion than in the first portion.

10. An optical fiber as in claim 1, wherein a doping concentration of the rare earth element is higher in the second portion than in the first portion.

11. An optical fiber as in claim 1, wherein a doped diameter of the rare earth element is greater in the second portion than in the first portion.

12. An optical fiber as in claim 1, wherein a mode field diameter of the second portion is greater than in the first portion.

13. An optical fiber as in claim 1, wherein a relative index difference of fiber layers is smaller in the second portion than in the first portion.

14. An optical fiber as in claim 1, wherein wavelength dispersion is larger in the second portion than in the first portion.

15. An optical fiber doped with a rare earth element to enable amplification of a wavelength division multiplexed (WDM) light as the WDM light travels through the fiber from a first point to a second point along the fiber, wherein
   a third point exists along the fiber between the first and second points at which a power of the WDM light reaches a level producing a nonlinear optical phenomena ±3 dB,
   a first portion of the fiber being between the first point and the third point, and a second portion of the fiber being between the third point and the second point, and
   the second portion of the fiber has a structure that suppresses the occurrence of the nonlinear optical phenomena as compared to the first portion.

16. An optical fiber as in claim 15, wherein the nonlinear optical phenomena is four wave mixing.

17. An optical fiber as in claim 15, wherein the first portion extends from the first point to the third point.

18. An optical fiber as in claim 15, wherein the second portion extends from third point to the second point.

19. An optical fiber as in claim 15, wherein
   the first portion extends from the first point to the third point, and
   the second portion extends from the third point to the second point.

20. An optical fiber as in claim 15, wherein an absorption and radiation per unit length with respect to the WDM light is greater in the second portion than in the first portion.

21. An optical fiber as in claim 15, wherein a doping concentration of the rare earth element is higher in the second portion than in the first portion.

22. An optical fiber as in claim 15, wherein a doped diameter of the rare earth element is greater in the second portion than in the first portion.

23. An optical fiber as in claim 15, wherein a mode field diameter of the second portion is greater than in the first portion.

24. An optical fiber as in claim 15, wherein a relative index difference of fiber layers is smaller in the second portion than in the first portion.

25. An optical fiber as in claim 15, wherein wavelength dispersion is larger in the second portion than in the first portion.

26. An apparatus comprising:
   a first optical fiber doped with a rare earth element to enable amplification of a wavelength division multiplexed (WDM) light as the WDM light travels through the first fiber from a first point to a second point along the first fiber, a power of the WDM light at the second point reaching a level substantially producing a nonlinear optical phenomena; and a second optical fiber connected to the first fiber at the second point so that the WDM light travels through the first fiber and then through the second fiber, the second fiber doped with a rare earth element to enable amplification of the WDM light as the WDM light travels through the second fiber, the second fiber having a structure that suppresses the occurrence of the nonlinear optical phenomena as compared to the first fiber.

27. An apparatus as in claim 26, wherein the nonlinear optical phenomena is four wave mixing.

28. An apparatus as in claim 26, wherein the second point is a point at which the power of the WDM light reaches a level producing the nonlinear optical phenomena ±3 dB.

29. An apparatus as in claim 26, wherein an absorption and radiation per unit length with respect to the WDM light is greater in the second fiber than in the first fiber.

30. An apparatus as in claim 26, wherein a doping concentration of the rare earth element is higher in the second fiber than in the first fiber.

31. An apparatus as in claim 26, wherein a doped diameter of the rare earth element is greater in the second fiber than in the first fiber.

32. An apparatus as in claim 26, wherein a mode field diameter of the second fiber is greater than in the first fiber.

33. An apparatus as in claim 26, wherein a relative index difference of fiber layers is smaller in the second fiber than in the first fiber.

34. An apparatus as in claim 26, wherein wavelength dispersion is larger in the second fiber than in the first fiber.

35. An optical amplifier comprising:
an optical fiber doped with a rare earth element, a wavelength division multiplexed (WDM) light traveling through the fiber from a first point to a second point along the fiber; and
an light source providing excitation light to the fiber so that the WDM light is amplified as the WDM light travels through the fiber, wherein
a third point exists along the fiber between the first and second points at which a power of the WDM light substantially reaches a level producing a nonlinear optical phenomena,
a first portion of the fiber being between the first point and the third point, and a second portion of the fiber being between the third point and the second point, and
the second portion has a structure that suppresses the occurrence of the nonlinear optical phenomena as compared to the first portion.

36. An optical amplifier as in claim 35, wherein the nonlinear optical phenomena is four wave mixing.

37. An optical amplifier as in claim 35, wherein the first portion extends from the first point to the third point.

38. An optical amplifier as in claim 35, wherein the second portion extends from third point to the second point.

39. An optical amplifier as in claim 35, wherein
the first portion extends from the first point to the third point, and
the second portion extends from the third point to the second point.

40. An optical amplifier as in claim 35, wherein the third point is a point at which the power of the WDM light reaches a level producing the nonlinear optical phenomena ±3 dB.

41. An optical amplifier as in claim 36, wherein the third point is a point at which the power of the WDM light reaches a level producing the nonlinear optical phenomena ±3 dB.

42. An optical amplifier as in claim 37, wherein the third point is a point at which the power of the WDM light reaches a level producing the nonlinear optical phenomena ±3 dB.

43. An optical amplifier as in claim 38, wherein the third point is a point at which the power of the WDM light reaches a level producing the nonlinear optical phenomena ±3 dB.

44. An optical amplifier as in claim 39, wherein the third point is a point at which the power of the WDM light reaches a level producing the nonlinear optical phenomena ±3 dB.

45. An optical amplifier as in claim 35, wherein an absorption and radiation per unit length with respect to the WDM light is greater in the second portion than in the first portion.

46. An optical amplifier as in claim 35, wherein a doping concentration of the rare earth element is higher in the second portion than in the first portion.

47. An optical amplifier as in claim 35, wherein a doped diameter of the rare earth element is greater in the second portion than in the first portion.

48. An optical amplifier as in claim 35, wherein a mode field diameter of the second portion is greater than in the first portion.

49. An optical amplifier as in claim 35, wherein a relative index difference of fiber layers is smaller in the second portion than in the first portion.

50. An optical amplifier as in claim 35, wherein wavelength dispersion is larger in the second portion than in the first portion.

51. An optical amplifier comprising:
a first amplification stage including an optical fiber, the first amplification stage amplifying a light as the light travels through the optical fiber to produce a first stage amplified light which substantially reaches a power level producing a nonlinear optical phenomena at an output of the first amplification stage; and
a second amplification stage including an optical fiber, the second amplification stage amplifying the first stage amplified light as the first stage amplified light travels through the optical fiber of the second amplification stage, the optical fiber of the second amplification stage having a structure that suppresses the occurrence of the nonlinear optical phenomena as compared to the optical fiber of the first amplification stage.

52. An optical amplifier as in claim 51, wherein the nonlinear optical phenomena is four wave mixing.

53. An optical amplifier as in claim 51, wherein the power level of the first stage amplified light at the output of the first amplification stage is ±3 dB from the level at which the nonlinear optical phenomena is produced.

54. An optical amplifier as in claim 51, wherein an absorption and radiation per unit length with respect to a wavelength division multiplexed light is greater in the optical fiber of the second amplification stage than in the optical fiber of the first amplification stage.

55. An optical amplifier as in claim 51, wherein the optical fibers of the first and second amplification stages are each doped with a rare earth element, and a doping concentration of the rare earth element is higher in the optical fiber of the second amplification stage than in the optical fiber of the first amplification stage.

56. An optical amplifier as in claim 51, wherein the optical fibers of the first and second amplification stages are each doped with a rare earth element, and a doped diameter of the rare earth element of the optical fiber of the second amplification stage is greater than in the optical fiber of the first amplification stage.

57. An optical amplifier as in claim 51, wherein a mode field diameter of the optical fiber of the second amplification stage is greater than in the optical fiber of the first amplification stage.

58. An optical amplifier as in claim 51, wherein a relative index difference of fiber layers is smaller in the optical fiber of the second amplifier stage than in the optical fiber of the first amplification stage.

59. An optical amplifier as in claim 51, wherein wavelength dispersion is larger in the optical fiber of the second amplifier stage than in the optical fiber of the first amplification stage.

60. An optical amplifier as in claim 51, wherein the optical fiber of the second amplification stage is a first optical fiber of the second amplification stage, and the second amplification stage includes a second optical fiber, the second amplification stage amplifying the first stage amplified light as the first stage amplified light travels through the second optical fiber.

61. An optical amplifier as in claim 60, wherein the first optical fiber is upstream of the second optical fiber, so that, in the second amplification stage, light is amplified in the first optical fiber and then amplified in the second optical fiber.

62. An optical amplifier as in claim 51, wherein the optical fibers of the first and second amplification stages are rare earth element doped optical fibers.

63. An optical amplifier as in claim 51, further comprising:

a housing which houses both the first and second amplification stages.

64. An optical amplifier comprising:

a first optical fiber doped with a rare earth element and having a corresponding mode field diameter; and a second optical fiber doped with a rare earth element and having a corresponding mode field diameter which is different than the mode field diameter of the first optical fiber, the first and second optical fibers connected together so that light travels through the first optical fiber and then through the second optical fiber and is thereby amplified.

65. An optical amplifier as in claim 64, wherein the mode field diameter of the second optical fiber is larger than the mode field diameter of the first optical fiber.

66. An optical amplifier comprising:

a first optical fiber doped with a rare earth element and having a corresponding doping concentration; and a second optical fiber doped with a rare earth element and having a corresponding doping concentration which is different than the doping concentration of the first optical fiber, the first and second optical fibers connected together so that light travels through the first optical fiber and then through the second optical fiber and is thereby amplified.

67. An optical amplifier as in claim 66, wherein the doping concentration of the second optical fiber is larger than the doping concentration of the first optical fiber.

68. An optical amplifier comprising:

a first optical fiber doped with a rare earth element and having a corresponding core diameter; and a second optical fiber doped with a rare earth element and having a corresponding core diameter which is smaller than the core diameter of the first optical fiber, the first and second optical fibers connected together so that light travels through the first optical fiber and then through the second optical fiber and is thereby amplified.

69. An optical amplifier as in claim 68, wherein the second optical fiber has a dispersion value which causes four wave mixing to be suppressed in the second optical fiber.

70. An optical fiber doped with a rare earth element to enable amplification of a light as the light travels through the fiber from a first point to a second point along the fiber, wherein a third point exists along the fiber between the first and second points at which a power of the light reaches a level producing a nonlinear optical phenomena ±3 dB, a first portion of the fiber being between the first point and the third point, and a second portion of the fiber being between the third point and the second point, and the second portion has a structure that suppresses the occurrence of the nonlinear optical phenomena as compared to the first portion.

\* \* \* \* \*